J. R. GAMMETER.
FLAT SECTION PNEUMATIC TIRE.
APPLICATION FILED DEC. 2, 1914.
1,188,062.
Patented June 20, 1916.
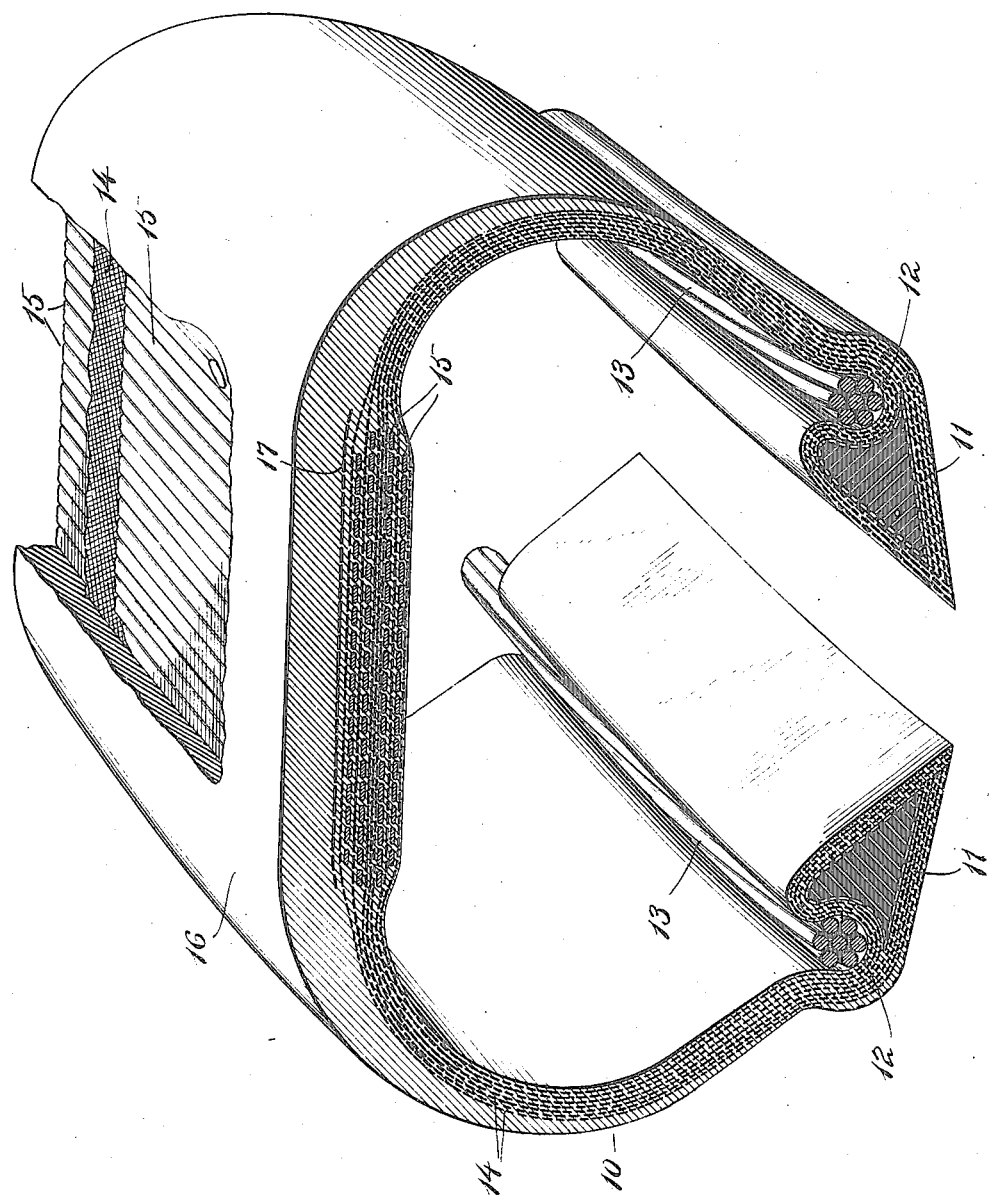

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

FLAT-SECTION PNEUMATIC TIRE.

1,188,062.

Specification of Letters Patent. Patented June 20, 1916.

Application filed December 2, 1914. Serial No. 875,087.

*To all whom it may concern:*

Be it known that I, JOHN R. GAMMETER, a citizen of the United States, residing at Akron, in the county of Summit and State of Ohio, have invented certain new and useful Improvements in Flat-Section Pneumatic Tires, of which the following is a specification.

This invention relates to pneumatic tires in which the outer or working portion of the tire and air-chamber (as distinguished from the inner or attaching portion of the tire adjacent to the rim) is transversely flattened, oblate, or oval in cross-section instead of being substantially circular. Among the advantages of this type are the ability to sustain a given load with less air pressure and with less tread deflection on account of its increased area in contact with the ground, in consequence of which the tires are more easily inflated and there is less strain upon the walls and the fastenings due to the air pressure, a smaller amount of action at the hinge-lines where the tread walls join the side walls, and less liability of the rubber tread to separate from the carcass. Tires of this type may be used in large sizes on commercial vehicles carrying heavy loads at relatively high speeds, in place of dual or triple pneumatics, and they possess the advantage over the latter of being more easily applied and removed, requiring a less expensive rim construction, and having no intermediate groove or grooves for the collection of dirt, etc., besides having a greater load-sustaining capacity for a given width of wheel. Owing to the unnatural shape of the air-chamber and tire-wall, necessitating the use of inextensible bands, cords, or fabric in the tread wall, and involving novel stress relations between the side and tread walls, the problem of producing a successful tire of this type differs materially from that of making the ordinary pneumatic, and although flat-section tires have been proposed, no example of this type has actually become known commercially, so far as I am aware, previous to my invention.

It is the object of my invention to provide a simple and durable tire of flattened or oval section, and a further object is to provide a structure which can be built at a low enough cost to make it available for general use.

The drawing represents a perspective sectional view of a pneumatic tire casing constructed according to my invention.

10 is a tire casing which in this case is provided with securing portions of the type described in the von Lude Patent No. 780,209, the same having inwardly directed or "reversed" beads 11 with an internal thickening or stiffening of semi-hard rubber, grooves or channels 12, and inextensible rings or cables 13 in said grooves adapted to be located in place after the tire is removed from the making-core; but the usual or any suitable form of bead structure may be used. The side walls and portions of the tread wall of the carcass are made of a number of plies 14 of rubberized threads, cords or fabric, and in the tread wall are incorporated one or more layers (in this instance four layers) of inextensible cords or bands 15. For these inextensible tread layers, I prefer to use bands or cords of rubberized cotton thread twisted into a cable and flattened, such as are used in the manufacture of the well-known Silverton cord tires, but I may employ any suitable form of fibrous or metallic cord, wire or band laid "straight" in parallel strands or turns circumferentially around the tire, and preferably unwoven or without filling threads.

If cords of cotton or other textile fiber are used, it is necessary to wind in place a considerable length of such cord in order to secure the necessary factor of safety for a heavy-duty tire, and the use of several layers of cord, producing a substantial thickening of the tread wall of the carcass, introduces a difficulty in so arranging the cord layers and the fabric layers, and connecting the tread wall with the side wall, as to avoid excessive working and deterioration of the carcass at or about the hinge-lines of the tire. Rupture along these lines, and separation of the tire components, are somewhat difficult to avoid in any tire of this general type on account of the difference in flexing and driving characteristics between the side walls and the inextensible bands of the tread, and the difficulty of properly connecting the several components. It is further obvious that the cutting of the tread bands through the tread rubber or through the layers of thread, cord, or fabric which extend from the side walls into the tread wall must be avoided. I prefer to use layers 14 of the usual bias-cut woven fabric, or bias threads or cords, in the side walls, and in the tread wall between or beneath the cord layers 15, in order to provide a sufficiently flexible wall which will properly transmit the working strains between the beads and the inextensible tread bands; and to properly connect these bands with the side-wall and the neighboring tread-wall layers of the carcass, and with the rubber, and prevent them from cutting through or working loose, I prefer to make these inextensible bands, at least on their outer surface, of cotton or other fiber. For convenience, the material of the layers 14 may be referred to as fabric, although diagonal threads or cords with no filling threads or with none having a strain-resisting function, are regarded as equivalents in the broad sense, it being noted however that the combination of longitudinally-extending, inextensible cord layers and alternating bias, woven fabric layers connected together by vulcanized rubber serves very effectually to keep the inextensible elements in place, is relatively cheap to construct, ties the tread-wall properly to the side walls when the cords are incorporated in the carcass itself, as in the illustration here given, and preserves in a large measure the flexibility of the tread wall. The texture of one of the upper layers of bias fabric is indicated in plan near the top of Fig. 1. Above the outer layer of cord 15 and embedded in the tread rubber 16 is laid the usual breaker strip 17, preferably of straight fabric.

In building the tire, the first ply of rubberized fabric is laid on the making-core in the usual way and its ends joined by lapping. Then a layer of rubberized cord 15 is wound circumferentially around the tread, the surface of the core being recessed to conform to the thickening of the tread wall produced by the large number of cord layers in the case of a heavy-duty tire. Each cord layer is composed of a single length wound in successive convolutions, starting on one side of the tire and ending on the other side, as is evident with respect to the outer cord layer in Fig. 1, but I do not wholly confine myself to a single length of successive convolutions. After wrapping the first or inner layer of cord in the tread-wall, the second of the layers 14 of rubberized fabric is laid in the same manner as the first, and then another layer of cord. When the tread-recess has been filled until the wall is about level (that is, with two fabric layers and two cord layers in the particular illustration) I then prefer to lay a plurality of plies of fabric 14 (three, as shown) around the middle section-plane of the carcass without any intervening cord layers in the tread, after which the building up of the carcass is continued as described, with a layer of cord in the tread, then a layer of fabric in the sides and tread and so on, the final layer being of fabric, followed by a covering of sheet rubber, then the breaker strip and then the rubber tread. In this way the cord and fabric layers are symmetrically disposed in the tread wall, the inextensible cord layers being virtually divided into inner and outer groups or sections by the middle plies of fabric, the thickening of the tread wall extending both inwardly and outwardly of the carcass. This construction I have found effective in balancing the outwardly-acting air-pressure against inward flexing forces, and avoiding any excessive bending and tendency to rupture along the lines where the corded tread wall joins the side walls of the carcass. The cords 15 in this form of my invention are distinctly an integral part of the tire carcass, although this feature is not necessarily always present or always so pronounced as in the case illustrated.

The horizontal flattening of the cords reduces their tendency to cut the rubber or the fabric, keeps the adjacent fabric plies smooth, reduces the tread thickness, and increases flexibility. The textile surface of the cords allows them to be firmly bound to the fabric layers by means of the rubber, and this tying together is rendered more secure by the flattening of the cords. Thus the driving and resisting strains are properly transmitted between the inextensible tread members 15 and the bias threads of the fabric layers 14. The vulcanization of the tire after the rubber tread has been applied welds the whole into a unit structure. I prefer to subject these casings to an internal fluid pressure while being cured, in order to keep the fabric from wrinkling, to place all the elements of the carcass under an approximately even tension, and to compress the layers of fabric, cord and rubber firmly together.

The number of layers of cord may be varied, depending upon the total pressure to be sustained by the tread wall, and the strength of the material of which the cords are composed, and the number of canvas layers may likewise be varied. It is also possible to embody the invention in forms of tire covers or casing other than complete casings with edges attached directly to the rim, such for example as a protective cover for a casing, which I have not illustrated, as devices of this nature for ordinary pneumatics are well known.

I claim:

1. In a pneumatic tire, a tread-flattening structure comprising a layer composed of a length of inextensible, rubberized cord wound circumferentially in successive convolutions, and means tying said convolutions together, the whole being vulcanized.

2. In a pneumatic tire, a substantially-flat tread-wall structure comprising a layer composed of a length of relatively-heavy twisted rubberized cord wound in successive convolutions, and layers of rubberized, bias woven fabric embracing and vulcanized to said cord layer.

3. In a pneumatic tire, a tread-flattening structure comprising a plurality of inextensible layers each consisting of a length of cord wound circumferentially in successive convolutions, and rubberized fabric layers vulcanized to the cord layers.

4. In a pneumatic tire, a carcass composed of a plurality of rubberized, bias, woven fabric layers, and a plurality of rubberized, inextensible cord layers interposed between and vulcanized to the fabric layers in the tread wall and serving to flatten said tread wall, each cord layer consisting of a separate length of cord wound circumferentially in parallel turns.

5. In a pneumatic tire, a tread-flattening structure comprising a plurality of layers of rubberized fabric, and an inextensible cord layer interlying and vulcanized with the fabric layers, said cord layer being composed of parallel strands or turns of horizontally-elongated or flattened section.

6. In a pneumatic tire, a tread-flattening structure comprising a plurality of superposed, inextensible layers of horizontally-flattened rubberized cord, and a plurality of alternate layers of rubberized, bias fabric vulcanized to the cord layers.

7. A pneumatic tire casing of oblate section comprising a plurality of layers of fabric forming the side and tread walls of the carcass, and a layer of transversely-flattened, rubberized fibrous cord laid in circumferential strands or turns between said fabric layers in the tread wall of the carcass and vulcanized thereto.

8. A pneumatic tire casing of oblate section comprising a carcass whose side and tread walls include a plurality of layers of rubberized fabric which lie together in the middle plane of the tread wall, and circumferentially-inextensible cord layers lying on opposite sides of said fabric layers in the tread wall.

9. A pneumatic tire casing of oblate section comprising two groups of circumferentially-inextensible cord layers lying on opposite sides of the middle plane in the tread wall of the carcass, and fabric layers forming the side and tread walls, a plurality of said fabric layers lying in contact between the said groups, and others of said fabric layers lying between the cord layers in each group.

In testimony whereof I have hereunto set my hand in the presence of two subscribing witnesses, this 30 day of November, 1914.

JOHN R. GAMMETER.

Witnesses:
WALTER C. MEHNS,
ILLA N. KIRN.